United States Patent [19]
Silverberg

[11] 4,285,590
[45] Aug. 25, 1981

[54] PRECESSION SCANNING SYSTEM FOR COPIER DEVICE

[75] Inventor: Morton Silverberg, Rochester, N.Y.

[73] Assignee: Xerox Corporation, Stamford, Conn.

[21] Appl. No.: 197,384

[22] Filed: Oct. 15, 1980

[51] Int. Cl.³ .................. G03G 15/28; G03B 27/60
[52] U.S. Cl. ............................. 355/8; 355/3 BE; 355/16; 355/73
[58] Field of Search .............. 355/8, 3 BE, 11, 60, 355/65, 66, 73, 3, 3 DD, 37 R, 10, 16

[56] References Cited

U.S. PATENT DOCUMENTS

| | | | |
|---|---|---|---|
| 3,454,335 | 7/1969 | Caldwell et al. | 355/8 |
| 3,630,608 | 12/1971 | Sage | 355/11 X |
| 3,650,621 | 3/1972 | Lewis et al. | 355/8 |
| 3,694,070 | 9/1972 | Libby | 355/66 X |
| 3,754,822 | 8/1973 | Melrase | 355/50 X |
| 4,003,651 | 1/1977 | Hashida et al. | 355/16 |
| 4,040,733 | 8/1977 | Satomi | 355/66 X |
| 4,080,053 | 3/1978 | Friday | 355/73 X |
| 4,118,118 | 10/1978 | Barto, Jr. | 355/8 |
| 4,140,386 | 2/1979 | Satomi | 355/8 X |

Primary Examiner—J. V. Truhe

[57] ABSTRACT

An imaging system is provided for scanning stationary objects in an object plane and projecting the image onto a moving photoreceptor in a direction opposite the photoreceptor movement. In a preferred embodiment, the scanning illumination elements comprise a dual rate mirror system, a fixed lens and a rotating mirror which reflects the projected image onto a portion of the photoreceptor surface which has been made curved in the exposure zone.

5 Claims, 2 Drawing Figures

PRECESSION SCANNING SYSTEM FOR COPIER DEVICE

BACKGROUND AND PRIOR ART STATEMENT

This invention relates generally to a xerographic copying device and, more particularly to an optical system which scans a document lying in an object plane and projects the scanned image onto a moving flat photoreceptor at a rate faster than the rate of movement of the photoreceptor and in the direction opposite such photoreceptor movement.

Precession scan systems which expose images on a photoreceptor at a faster rate than the photoreceptor movement are known in the art. U.S. Pat. No. 3,454,335 (Caldwell) assigned to the same assignee as the present invention, discloses a method of projecting images on microfilm cards which are moved past a stationary lens and mirror system onto a drum photoreceptor. The drum and microfilm are moved at the same speed but the image is precessed, (i.e. moved in a direction opposite to the drum motion) onto the drum surface by means of a slit aperture which moves in a direction opposite that of the drum. This combined slit and drum rotation exposes the drum at a speed (rate) that is greater than the surface speed of the drum. This scanning system demonstrates two of the advantages gained by image precession: the process speed of the system can be set at a lower speed for equivalent copy rate (copies per minute) and the gap ordinarily present between images (due to the return time of the scan optics) can be reduced or eliminated if desired. Scan return velocities for a given copy rate can also be minimized for a given copy rate thus reducing scan accelerations, forces and vibrations. A problem with such a system, however, is that defocusing errors may result in developed images unacceptable for some systems. The errors are introduced because the image reflected from the drum mirror to the slit does not maintain perpendicularity to a tangential line at the drum surface.

This defocusing problem is addressed in copending U.S. Application Ser. No. 013,098 (Glab), now U.S. Pat. No. 4,232,960, assigned to the same assignee as the present invention. Glab solves the problem of field tilt in his particular scan system, by using linear and rotational motions of optical elements located near the drum surface to scan the image onto the drum at the angle corresponding to the angle of reflection of the image from the platen.

Another prior art device which utilizes precession onto a drum photoreceptor is disclosed in U.S. Pat. No. 3,650,621 (Lewis) also assigned to the same assignee as the present invention. Lewis discloses a system wherein an imaging device is moved in an arcuate path which is in a direction opposite to drum rotation to scan document on a curved platen onto the drum.

Precession onto a flat photoreceptor surface introduces different problems requiring a different set of solutions. U.S. Pat. No. 3,754,822 (Melrose) also assigned to the same assignee as the present invention, discloses a scan system wherein a plate and flat photoreceptor move synchronously in the same direction and the scan optics move in the opposite direction at a suitable speed. The disclosure and claims are limited to the specific system disclosed and do not address problems in systems which, for example, have a stationary object or which have a lens movement separate from that of a scan lamp movement. In higher volume copiers, a preferred method of scanning has been to utilize a full-rate, half-rate mirror system which maintains proper object-to-lens distance during the course of travel. Such a scan system is relatively heavy, however, and the above-mentioned flyback inertial problems constitute an important limitation on the speed of the system.

SUMMARY

As noted above, precession onto a curved and onto a flat photoreceptor each have different problems which must be overcome. The present invention is directed to a third hybrid configuration wherein a portion of a normally flat photoreceptor belt is curved along an exposure zone. For a preferred embodiment, a stationary object in an object plane is scanned by a full-rate, half-rate illumination scan assembly. The scanned image is projected by a lens, and reflected from a rotatable mirror onto the curved surface. The mirror is adapted to "walk" or precess the image onto the photoreceptor in a direction opposite to the direction of travel. The radius of curvature of the photoreceptor is made equal to the mirror to belt distance.

DRAWINGS

DESCRIPTION

Figure 1:
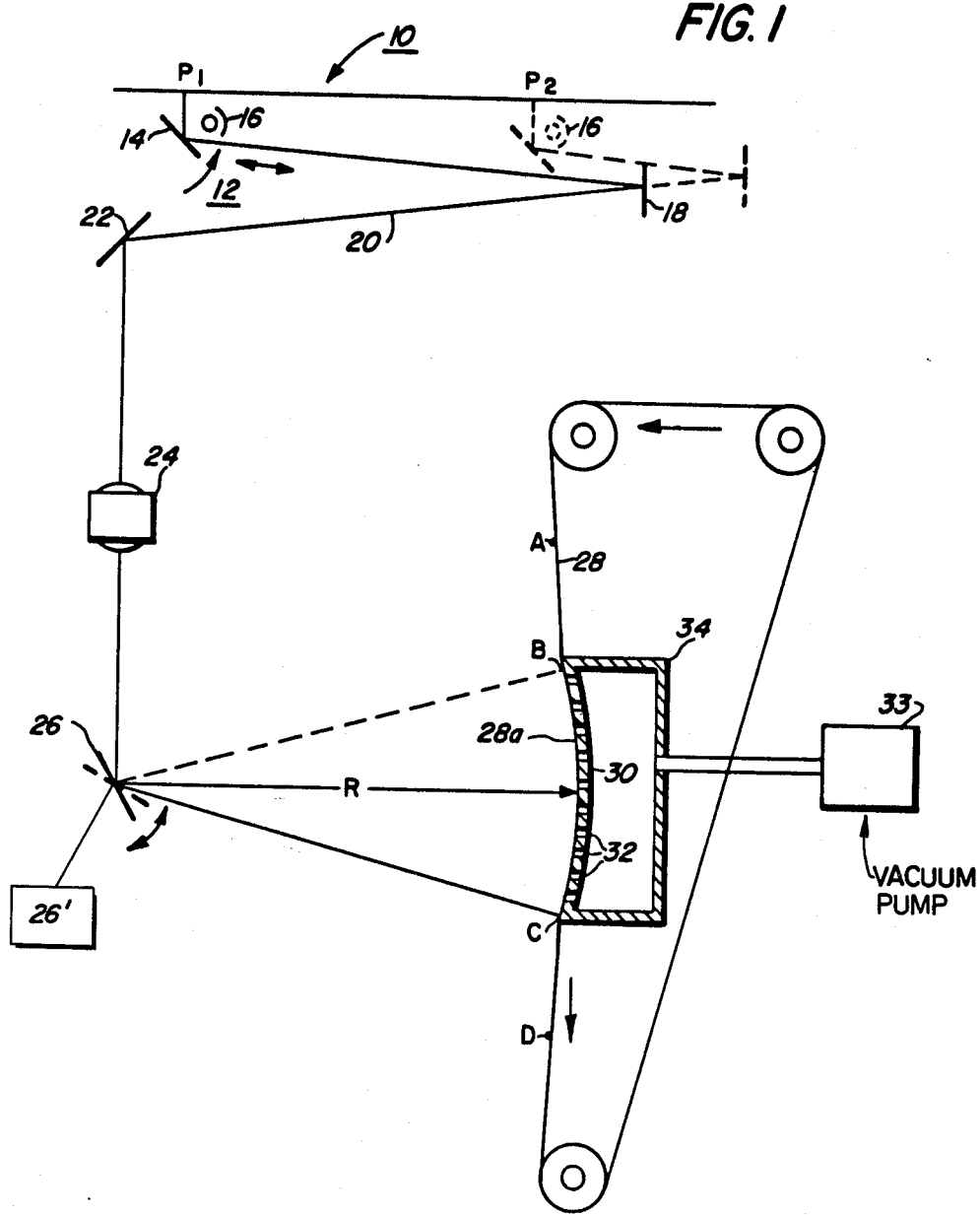
FIG. 1 shows a preferred embodiment of a dual rate precession scanning system according to the invention.

Referring now to the FIG. 1, there is shown a 1:1 precession imaging system utilizing a full-rate/half-rate mirror system, a fixed lens and a rotating photoreceptor mirror. A document 10 having a scan length defined by points $P_1P_2$ is supported on a platen (not shown). The document is scanned by a dual rate mirror assembly generally designated as 12. Assembly 12 comprises mirror 14 and lamp assembly 16 moving at a first velocity $V_{m1}$ and a second mirror 18 moving at a second velocity $V_{m2}$ which is $\frac{1}{2} V_{m1}$. The total object-to-lens distance is thereby maintained constant. An image of the document object points, represented by a principal ray travelling along optical axis 20 is scanned by mirror 14, reflected from moving mirror 18 and folding mirror 22 into fixed lens 24. The image is then reflected from oscillating mirror 26 onto a curved portion 28a of belt 28. Belt curvature can be obtained by fixing vacuum platen 30 of proper concavity in the exposure zone. Plate 30 has a plurality of holes 32 communicating with a vacuum chamber 34. Upon evacuation of chamber 32 by vacuum pump 33 portion 28a of belt 28 is drawn against the platen. The applied vacuum value should be chosen to be slightly greater then that required to overcome the photoreceptor tension, thus minimizing the normal load between the photoreceptor and platen. According to the invention, portion 28a has a radius of curvature R which is equal to the distance to the center of mirror 26.

In operation, and at the start of scan, components 14, 16 and 26 are in their solid line position. A portion AC of belt 28 is equal in length to document points $P_1P_2$ with point C defining the image point of document point $P_1$. Mirror assembly 12 moves from left to right scanning at the respective scan velocities. Mirror 26 begins to rotate by means 26' in a clockwise direction at a rate chosen to cause the projected image to be reflected along the entire portion of 28a, i.e. the projected image is "walked" or precessed along belt 28 along curved portion 28a in the direction opposite to the photoreceptor movement. At the end of scan, all the movable components are in their dotted line positions. Belt 28 has moved to position BD with document point $P_2$ being imaged at point B. The precession distance BC times belt velocity $V_B$ provides an added increment of "free" flyback time. In other words, the time requirements for returning the movable components to the start of scan position can be reduced since the belt must travel to at least point C before the next scan cycle can begin. The values of precession distance BC can be varied by changing the rotational speed of mirror 26 and, if necessary, the dimension of curved portion 28a. Depending on the chosen velocity relationship of scan, rotation mirror and process speeds, each scan cycle can begin again at point C thereby eliminating completely an interdocument gap. However, for some systems, some amount of interdocument gap may be necessary and desirable, i.e. to allow copy paper to be properly synchronized with the image on the photoreceptor. The precession rate can therefore be set to allow for a larger flyback time to provide a desired "dead" space between images. A longer flyback time also has the desirable effect of reducing system acceleration and vibrations.

Figure 2:
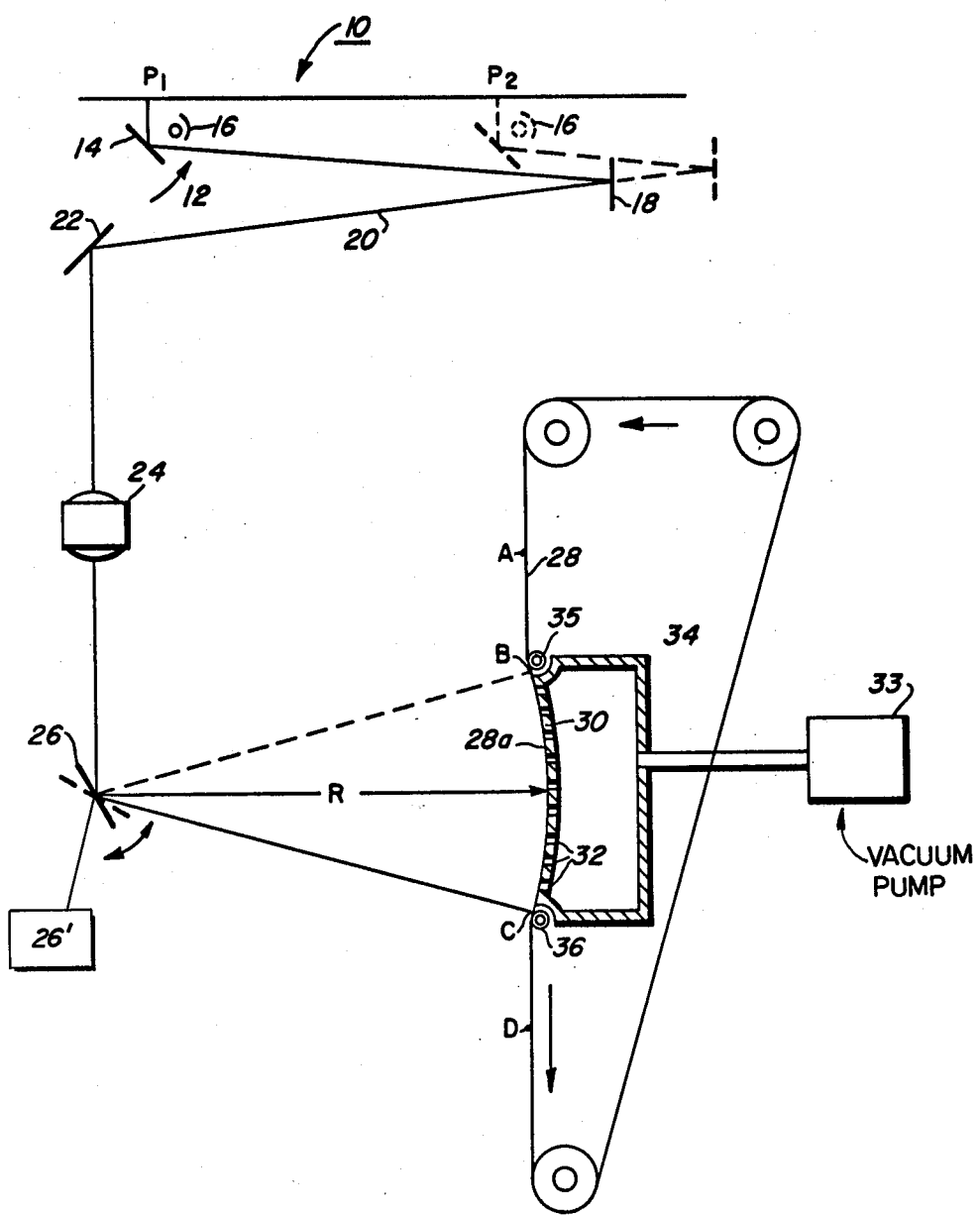
FIG. 2 shows a modified form of the FIG. 1 embodiment.

FIG. 2 shows the system of FIG. 1 modified by the addition of rollers 35 and 36 at the points of intersection between the vacuum-shaped portion and the normal adjacent portion of belt 28. The purpose of the rollers is to reduce drag at these intersection points.

Although the invention has been described with relation to a specific scan system, other modifications may be made to the embodiment disclosed herein without departing from the principles of the invention. For example, a single scanning assembly may be employed for certain systems.

What is claimed is:

1. A scanning system for projecting light images of a stationary object at an object plane along an optical path onto a curved portion of a photoreceptor moving in a first direction comprising scanning illumination means for scanning said object, projecting means for transmitting said scanned object images, reflecting means positioned between said projecting means and said photoreceptor for directing said transmitted image into a curved exposure zone of said photoreceptor, means for introducing said curvature of said photoreceptor in said exposure zone, said curved portion having a radius defined as an arc of a circle equal to the distance between said curved portion and the center of said reflecting means, means for rotating said reflecting means so as to reflect said transmitted image along said curved portion in a direction opposite to said first direction.

2. The scanning system of claim 1 wherein said scanning illumination means includes a dual-rate scan mirror assembly.

3. The scanning system of claim 1 wherein said means for introducing photoreceptor curvature includes a platen member having the appropriate curved configuration and vacuum means for drawing the belt against said curved platen member.

4. The scanning system of claim 3 wherein said platen member has a plurality of holes therethrough, the holes communicating with said vacuum means.

5. The scanning system of claim 3 further including rollers, said belt member riding over said rollers.

* * * * *